Dec. 13, 1949     L. A. SCHERCK     2,491,336
MULTIPLE DRIP COFFEE URN
Filed Nov. 15, 1947
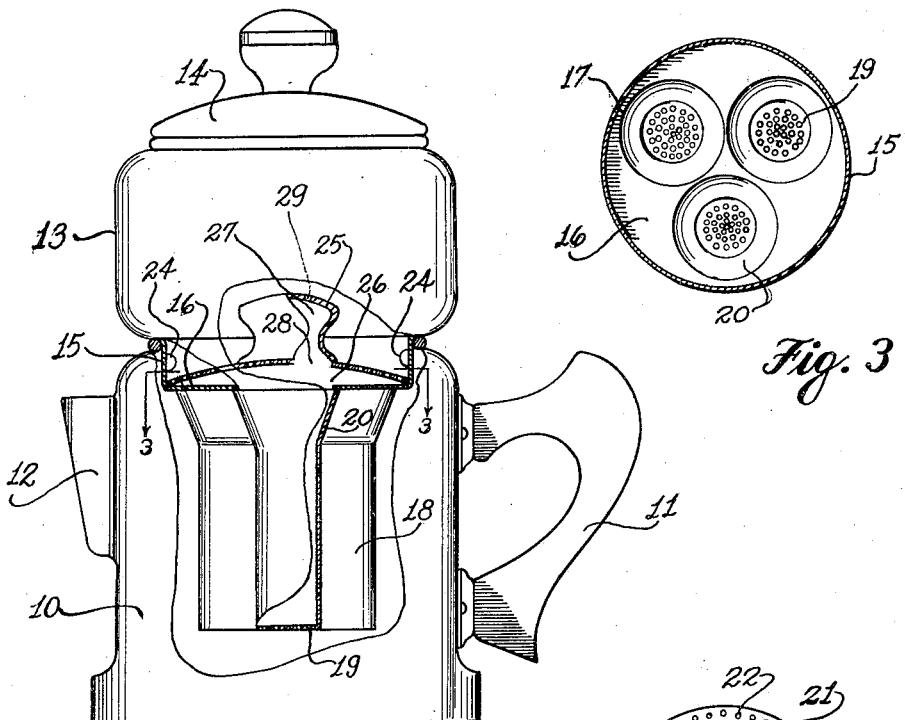
Fig. 3
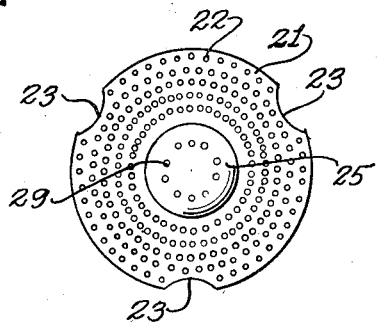
Fig. 4
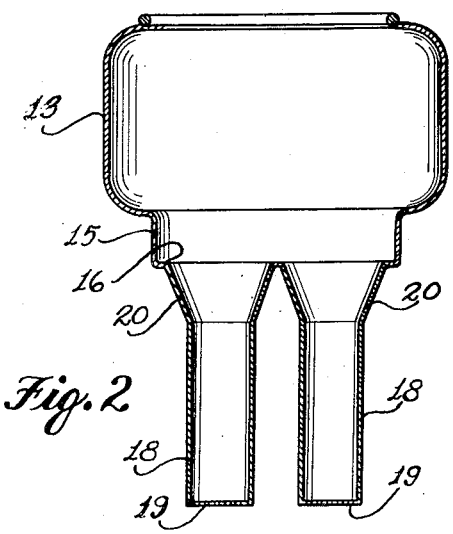
Fig. 1
Fig. 2
INVENTOR.
LEWIS A. SCHERCK
BY
Wilkinson Mawhinney
ATTORNEYS Patented Dec. 13, 1949

2,491,336

UNITED STATES PATENT OFFICE 2,491,336

MULTIPLE DRIP COFFEE URN

Lewis A. Scherck, New Orleans, La.

Application November 15, 1947, Serial No. 786,205

2 Claims. (Cl. 99—298)

The present invention relates to improvements in multiple drip coffee urns and relates more particularly to improvements over my prior Patent No. 1,804,278, dated May 5, 1931.

An object of the present invention is to provide a coffee urn of this class which upon the introduction of boiling water into the brewing receptacle of the same will more readily pass the water through the coffee therein thereby producing a much stronger and better flavored beverage than is ordinarily obtained by the use of other coffee urns.

Another object of the invention is to provide a coffee urn having a drip attachment so constructed as to eliminate the use of accessories, such as cloth bags, filter papers and the like, which detract from the true flavor of the coffee being brewed.

A still further object of the invention is to provide a coffee urn of this class whereby as the coffee therein expands during the brewing process means are provided for such expansion, thus eliminating the compaction of coffee against the walls of the retainers thereby not permitting the passage of the hot water therethrough.

A still further object of the invention is to provide a device of this class being durable and permitting of economical manufacture and simplicity of use.

A still further object of this invention is to provide a device of this class whereby the water is divided evenly over the coffee thereby producing a uniform beverage.

With the foregoing and other objects in view, the invention will be more fully described hereinafter and more particularly pointed out in the appended claims.

In the drawings, in which like parts are denoted by the same reference characters throughout the several views, Figure 1 is a side elevational view of a device of this class constructed in accordance with the present invention and with parts broken away;

Figure 2 is a vertical section taken through the upper brewing chamber showing the coffee receptacle tubes;

Figure 3 is a horizontal section taken on the line 3—3 in Figure 1; and

Figure 4 is a top plan view of the foraminous water spreader as employed with the present invention.

Referring more particularly to the drawings, 10 designates a coffee receptacle having a handle 11 and spout 12. Receivable within the coffee receptacle 10 is a water receptacle 13 having a top 14 and a lower wall 15 of reduced diameter such as to be received within the receptacle 10.

Integral with the lower wall 15 is a bottom 16 having openings 17 therethrough for receiving the coffee tubes being three or more in number and evenly spaced circumferentially about the base 16. Such receptacles comprise tubular members 18 having foraminous bases 19 and enlarged throats 20, such throats being inverted truncated cones with the larger diameters being received into the bottom 16 of the water receptacle 13.

A water spreader 21 having perforations 22 and notches 23 is received within the receptacle 13 and seats within the confines of the lower wall 15 and against the bottom 16. The lower wall 15 is indented about its periphery forming projections 24 within the receptacle 13. Notched portions 23 of the water spreader 21 are provided to permit the passage of the water spreader 21 downwardly over the projections 24 and to permit the locking engagement of the same.

A handle or knob 25 is provided on the water spreader 21 to permit the insertion and withdrawal of the same from the receptacle.

In operation the water receptacle 13 is placed within the coffee receptacle 10. Coffee is added at the rate of one tablespoon for each cup and one additional for the pot. For example, if it is desired that six cups of coffee be brewed, seven tablespoons of coffee are evenly divided between the three tubular members 18 such that the coffee level is just below the enlarged throat 20. Two tablespoons of cold water are poured on the coffee in each tube and the same is allowed to stand for about one minute.

The water spreader 21 is locked in place and then boiling water slowly poured over the spreader using the quantity of water necessary to obtain the strength of coffee desired. The function of the enlarged throat, which is of truncated conical construction, is to decrease the pressure of the coffee on the spreader 21 as it swells thereby permitting the boiling water to run through the grounds more rapidly saving time of the brewing and also bringing the boiling water in contact with the coffee at a high temperature.

With prior constructions in which tubes 18 of uniform diameter throughout and lacking the funnel shaped upper sections 20, the introduction of water down through the dry ground coffee is attended by an expansion of the coffee particles in all directions until restrained by the outer walls of the tubes 18. As a consequence of this restraint the swelling coffee particles react against the walls and tend to move inwardly with the result that the entire mass becomes substantially solid and loses its porous characteristics and resists the downward passage of the water therethrough. This condition is remedied by the relief afforded to such swelling coffee particles by the funnel shaped upper tube sections 20 which provide progressively expanding upper chambers above the tubes 18 and just above the dry coffee level in the tubes, whereby when the swelling action begins the coffee will immediately tend to rise in the funnel sections 20, thus relieving the pressure in the cylindrical tubes 18 below and also affording lateral or horizontal expansion for the saturated coffee mass in the upper sections 20 in a progressive manner as the mass rises in these sections 20.

Moreover the spreader disc 21 is in the form of a concavo-convex metallic or other disc, the concave side of which is presented to the base 16 of the upper receptacle and forms with such base a dome shaped chamber immediately above and communicating with the wider upper ends of the funnel shaped tube sections 20 thus providing an enlarged chamber in common to all of the tubes and into which the saturated coffee mass may also swell and expand to the relief of the tubes 18 and in prevention of the solidification previously described.

Furthermore it will be noted that the handle 25 is of a tubular form being entirely open at its lower end and communicating directly with the disc chamber 26 at the uppermost central portion thereof. The handle chamber 27 is thus open completely through its large opening 28 at the bottom with the dome chamber 26 to allow the unimpeded flow of the saturated coffee mass up into such handle. The remainder of the disc 21 is perforated with great numbers of orifices of minute diameter which permits the ready descent of the hot water therethrough but which resists the rise of the saturated coffee mass through these perforations. However such coffee mass has complete freedom of movement through the large opening 28 and into the handle chamber 27. The closed top of the tubular handle 25 is provided with perforations 29 preferably in a single circular series as shown in Figure 4 for the passage of a limited quantity of water, it being understood that the handle chamber 27 is over the space between the three tubes 18 although the outer sides of the chamber 27 may overlap the upper ends of the funnel shaped sections 20; and the outward row of perforations 29 is disposed generally above the upper wider ends of these funnel shaped sections 20 so as to introduce the water downwardly thereinto. Thus the chamber 27 of the handle 25 directly cooperates with the inverted frusto conical or funnel shape of the upper tube sections 20 in providing relief for the saturated coffee mass.

In my prior patent the tubes 6 were supported in an exposed manner above the liquid coffee receptacle 1; whereas according to the present invention the tubes 18 are so constructed and arranged relatively to the coffee receptacle 10 and the brewing receptacle 13 that the progress of the action of coffee extraction and brewing which takes place in the tubes 18, in the upper funnel sections 20 thereof and to some extent in the dome chamber 26 and the handle chamber 27 is accomplished within the confines of the outer receptacle 10 in a manner to conserve heat and prevent the dissipation of heat which is required for instantaneous and effective extraction and brewing of coffee and for the best results viewed from a standpoint of beverage aroma and taste.

While I have disclosed herein the best form of the invention known to me at the present time, I desire it to be understood that I reserve the right to make changes and modifications in the herein described embodiment of the invention provided such changes fall within the scope of the following claims.

What I claim is:

1. A multiple drip coffee urn comprising a coffee receptacle having an open upper end, a water receptacle wider than the open upper end of the coffee receptacle and having a cylindrical wall of reduced diameter adapted to fit through the open upper end of the coffee receptacle, a bottom extending across the lower portion of said tubular wall, tubes dependent from said bottom wall and opening upwardly through the bottom wall into the cylindrical wall chamber, said cylindrical wall chamber communicating interiorly with said water receptacle, the upper ends of said tubes flaring upwardly to and through said bottom wall with the wider portions of the flaring parts of the base members communicating with the tubular wall chamber, foraminous bases for said tubes, said tubes adapted to contain coffee supported on the foraminous bases up to a point just below said upwardly flaring parts, a perforated water spreader constructed on the section of a sphere having its upper edge adapted to seat in the angle between said cylindrical and said bottom walls and forming with the bottom wall a dome chamber communicating immediately with the wider portions of the flaring parts of the tubes, a hollow knob for the spreader having an internal chamber opening downwardly through the spreader and communicating immediately with said dome chamber, said knob having a perforated top wall exposed to the water in said water receptacle.

2. A multiple drip coffee urn as claimed in claim 1 comprising in addition projections extending inwardly from said cylindrical wall at a height above said bottom wall, said water spreader having peripheral notches adapted to move down over said projections whereby rotation of the spreader will lock the same in the cylindrical wall chamber.

LEWIS A. SCHERCK.

REFERENCES CITED

The following references are of record in the file of this patent:

UNITED STATES PATENTS

| Number | Name | Date |
|---|---|---|
| 1,666,070 | Page | Apr. 17, 1928 |
| 1,804,278 | Scherck | May 5, 1931 |
| 1,905,350 | Page | Apr. 25, 1933 |
| 1,952,752 | Haines | Mar. 27, 1934 |
| 2,052,476 | Koch | Aug. 25, 1936 |